H. H. GILDNER.
FLEXIBLE COUPLING.
APPLICATION FILED MAY 17, 1919.

1,323,046.

Patented Nov. 25, 1919.

INVENTOR
H. H. Gildner
BY
Duell, Warfield & Duell
ATTORNEY

UNITED STATES PATENT OFFICE.

HENRY H. GILDNER, OF MAPLEWOOD, NEW JERSEY, ASSIGNOR TO F. R. BLAIR & CO., INC., OF NEW YORK, N. Y., A CORPORATION OF NEW YORK.

FLEXIBLE COUPLING.

1,323,046.  Specification of Letters Patent.  Patented Nov. 25, 1919.

Application filed May 17, 1919. Serial No. 297,870.

*To all whom it may concern:*

Be it known that I, HENRY H. GILDNER, a citizen of the United States, residing at Maplewood, in the county of Essex and State of New Jersey, have invented certain new and useful Improvements in Flexible Couplings, of which the following is a full, clear, and exact description, such as will enable others skilled in the art to which it appertains to make and use the same.

This invention relates to power transmitting flexible couplings and with respect to its more specific features to the construction and arrangement for assembling parts of the coupling in efficient operative relation.

One of the objects of the invention is the provision of an efficient clamping device for the flexible element, adapted to avoid slip between the disk and the clamp.

Another object of the invention is the provision of a practical device adapted to positively transmit torque strain to and from the flexible element without substantial relative motion between the clamped parts thereby largely mitigating wear and increasing the life of the flexible element.

Other objects will be in part obvious and in part pointed out hereinafter.

The invention accordingly consists in the features of construction, combinations of elements and arrangement of parts, which will be exemplified in the construction hereinafter described and the scope of the application of which will be indicated in the following claims.

In the accompanying drawings forming part of this specification wherein similar reference characters refer to similar parts throughout the several views, Figure 1 is a longitudinal central section through a coupling embodying the invention;

Figure 1:
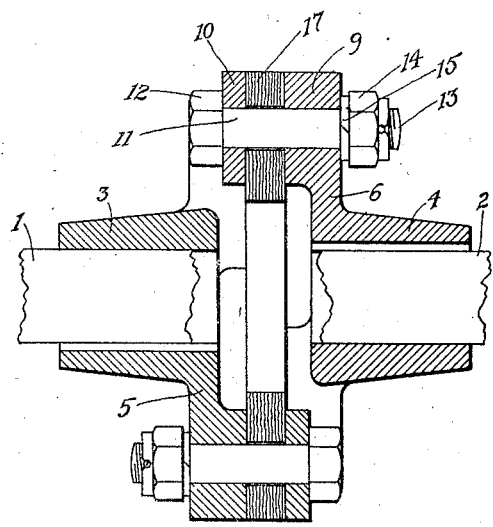

Referring now more specifically to the drawings, the numerals 1 and 2 indicate rotatable driving and driven shafts which are to be connected by a flexible element, as a disk 17, which is designed to transmit torque from the driving to the driven shaft to permit displacement of the axis of the two shafts angularly relative to each other while in operation. The numerals 3 and 4 indicate hubs fixed to rotate with the shafts 1 and 2 and the numerals 5 and 6 indicate arms extending from these hubs providing elements to which the intermediate flexible disk may be clamped. As illustrated, each hub has three arms so as to provide two spiders and the arms of one shaft are connected to the flexible disk 17 at points 7, 7, 7, alternating with those 8, 8, 8, to which the arms of the other shaft are connected, and at some distance radially from the axis of rotation. In the present embodiment the clamping devices for all the arms are similar and therefore a description of one will suffice for all.

On the outside of the flexible disk, at the several points 7 and 8, two clamping jaws 9 and 10 are disposed, the jaw 9 in the present embodiment being conveniently provided by proper fashioning of the outer end of the arm 6. At 11 a tension member is indicated; a bolt, having a head 12 and a threaded end 13 engaged by a nut 14 beneath which may be disposed a flexible locking washer 15. The clamping jaw 10 and the flexible disk 17 are each provided with openings through which the driving bolt 11 passes, the bolt opening in the disk 17 being larger in diameter than the bolt and the opening in the jaw 10 having a close fit on the bolt. In this wise the torque strain is transmitted without substantial relative movement between the bolt 11 and the jaw 10. And because the opening in the flexible disk 17 is somewhat larger than the bolt 11, the torque strain is transmitted through the clamped surface of the flexible disk rather than through the edges of the opening in the disk, thus avoiding wear and looseness of parts due thereto.

Figure 2:
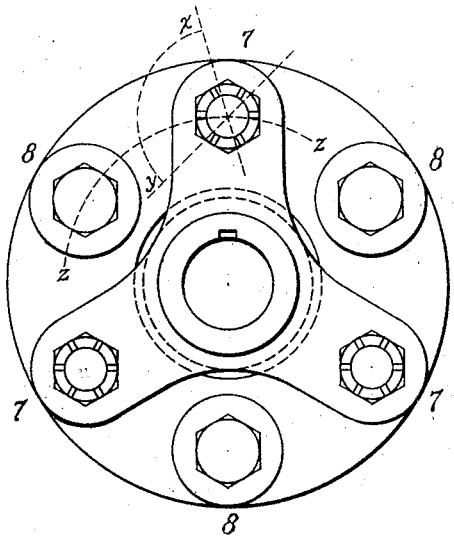
Fig. 2 is an elevation.
Figure 3:
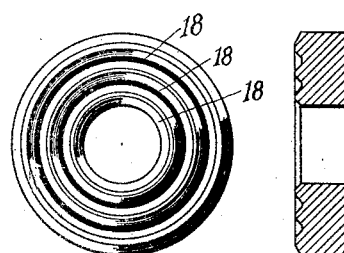
Fig. 3 is a face view of one form of buckle plate.
Figure 4:
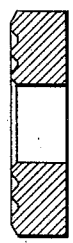
Fig. 4 is a cross-sectional view of Fig. 3.

In the present embodiment the clamping jaw 10 is a rigid member and when the several parts referred to are assembled and the nut 14 screwed up, the disk 17 is clamped firmly between the jaws 9 and 10. In order that the disk 17 may be positively clutched to the spiders, one of the clamping jaws, in the present embodiment the jaw 10, is toothed or corrugated on the face next to the disk. In the form illustrated a plurality of teeth are employed, these teeth as shown being one around another and adapted to depress the surface of the disk and effect clutching engagement therewith. In order that the pressure of clamping and strain of operation may have as little wear effect as possible on the disk, a plurality of teeth are preferably employed throughout a substantial portion of the area of the jaw 10 and the teeth are preferably made as long as possible and of uniform curvature so as to provide a large effective area for clamping purposes and as few sharp corners as may be. In the present embodiment the teeth are curved and disposed so that the arcs of curvature are adapted to surround the longitudinal axis of the bolt 11, and are constructed, or struck, on arcs of shorter radii than that of the arc of translation of the axis of said bolt. For instance, referring to Fig. 3, it will be seen that the teeth 18 are struck on circular arcs centering in the axis of the bolt and are continuous around the bolt and preferably concentric with the axis thereof. It will also be seen that arcuate portions of the teeth as, for instance, the portions intercepted between the dotted lines *x* and *y* (Fig. 2) are disposed to intersect the line of torque strain (dotted line *z*) through the axis of the bolt, this line coinciding with the arc of translation of said axis as it rotates around the center of rotation of the shafts 1 and 2.

Figure 6:
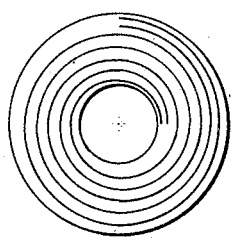
Fig. 6 is a face view, mainly diagrammatic of a modified form of buckle plate.
Figure 5:
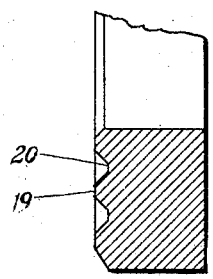
Fig. 5 is a sectional view of a part of Fig. 3 on an enlarged scale.

In the form shown in Fig. 6, the teeth are struck on a spiral arc and are also continuous around the bolt for 360 degrees of circular arc. The teeth in both forms are preferably constructed with flat tops, as indicated in the enlarged view at 19 (Fig. 5) and the spaces between the teeth are also flat, as indicated at 20.

The jaws 9 and 10 being rigid, the clamping effect, or pressure, is substantially uniform throughout the gripped area, the jaws gripping with this uniform pressure whatever be the distance of a gripped area from the center line of pressure, which latter, in the present embodiment, is an imaginary line coincident with the longitudinal axis of bolt 11. Should the jaws 9 and 10 be held by two bolts radially spaced apart, the center line of pressure would be midway between them. In either instance, the circular teeth would surround the center line of pressure, and present long uniformly curved teeth, corrugations or shoulders intersecting the arc of translation of the center of pressure in its movement around the axis of shafts 1 or 2, and providing a long arcuate area of contact with the flexible disk. In whichever direction rotation occurred, a uniformly rounded surface would present its convexity in the direction of rotation and there would be no sharp ends, as ends of teeth, to dig into the disk under the torque strain. A like effect may be obtained by making the teeth on spiral arcs, as illustrated in Fig. 6. One or two turns of the spiral for at least 360° each of circular arc would present sufficient gripping area so that the disk would not be destroyed or injuriously affected by the ends of the spiral tooth. The flexible disk 17 may be of annular form and made of a layer or layers of canvas impregnated with rubber; the disks being of substantial character to transmit the torque and yet permit bending to accommodate an angular relation between shafts 1 and 2.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent, is:—

1. In a torque-transmitting flexible coupling, in combination, a flexible disk, means adapted to connect said disk to another element for transmission of torque comprising clamping jaws between which the disk is interposed, and means adapted to effect clamping of the disk between the jaws, one of said jaws including one or more curved teeth, of greater degree of curvature than that of the arc of translation of the center of pressure between said jaws, disposed so that the arcs of curvature of the teeth are adapted to surround said center of pressure.

2. In a torque-transmitting flexible coupling, in combination, a flexible disk, means adapted to connect said disk to another element for transmission of torque comprising clamping jaws between which the disk is interposed, and means adapted to effect clamping of the disk between the jaws, one of said jaws including one or more teeth constructed on arcs of shorter radii than that of the arc of translation of the center of pressure between said jaws.

3. In a torque-transmitting flexible coupling, in combination, a flexible disk, means adapted to connect said disk to another element for transmission of torque comprising clamping jaws between which the disk is interposed, and means adapted to effect clamping of the disk between the jaws, one of said jaws including one or more teeth constructed on arcs centering in the center of pressure between said jaws and disposed to intersect the line of torque strain through said center of pressure.

4. In a torque-transmitting flexible coupling, in combination, a flexible disk, means adapted to connect said disk to another element for transmission of torque comprising clamping jaws between which the disk is interposed, and means adapted to effect clamping of the disk between the jaws, one of said jaws including one or more curved teeth, of greater degree of curvature than that of the arc of translation of the center of pressure between said jaws, disposed so that the arcs of curvature of the teeth are adapted to surround said center of pressure, one or more of said teeth being continuous for 360° of circular arc.

5. In a torque-transmitting flexible coupling, in combination, a flexible disk, means adapted to connect said disk to another element for transmission of torque comprising clamping jaws between which the disk is interposed, and means adapted to effect clamping of the disk between the jaws, one of said jaws including one or more teeth constructed on arcs of shorter radii than that of the arc of translation of the center of pressure between said jaws, one or more of said teeth being continuous for 360° of circular arc.

6. In a torque-transmitting flexible coupling, in combination, a flexible disk, means adapted to connect said disk to another element for transmission of torque comprising clamping jaws between which the disk is interposed, and means adapted to effect clamping of the disk between the jaws, one of said jaws including one or more teeth constructed on arcs centering in the center of pressure between said jaws and disposed to intersect the line of torque strain through said center of pressure, one or more of said teeth being continuous for 360° of circular arc.

7. In a torque-transmitting flexible coupling, in combination, a flexible disk having a bolt opening, clamping jaws between which said disk is disposed, and means adapted to effect clamping of the disk between the jaws comprising a bolt extending through said opening and one of said jaws, one of said jaws including one or more curved teeth, of greater degree of curvature than the arc of translation of the axis of said bolt, disposed so that the arcs of curvature of said teeth are adapted to surround said bolt.

8. In a torque-transmitting flexible coupling, in combination, a flexible disk having a bolt opening, clamping jaws between which said disk is disposed, and means adapted to effect clamping of the disk between the jaws comprising a bolt extending through said opening and one of said jaws, one of said jaws including one or more teeth constructed on arcs of shorter radii than that of the arc of translation of the axis of said bolt.

9. In a torque-transmitting flexible coupling, in combination, a flexible disk having a bolt opening, clamping jaws between which said disk is disposed, and means adapted to effect clamping of the disk between the jaws comprising a bolt extending through said opening and one of said jaws, one of said jaws including one or more teeth constructed on arcs centering in the axis of the driving bolt and disposed to intersect the line of torque-strain through said axis.

10. In a torque-transmitting flexible coupling, in combination, a flexible disk having a bolt opening, clamping jaws between which said disk is disposed, and means adapted to effect clamping of the disk between the jaws comprising a bolt extending through said opening and one of said jaws, one of said jaws including one or more curved teeth, of greater degree of curvature than the arc of translation of the axis of said bolt, disposed so that the arcs of curvature of said teeth are adapted to surround said bolt, one or more of said teeth being continuous for 360° of circular arc.

11. In a torque-transmitting flexible coupling, in combination, a flexible disk having a bolt opening, clamping jaws between which said disk is disposed, and means adapted to effect clamping of the disk between the jaws comprising a bolt extending through said opening and one of said jaws, one of said jaws including one or more teeth constructed on arcs of shorter radii than that of the arc of translation of the axis of said bolt, one or more of said teeth being continuous for 360° of circular arc.

12. In a torque-transmitting flexible coupling, in combination, a flexible disk having a bolt opening, clamping jaws between which said disk is disposed, and means adapted to effect clamping of the disk between the jaws comprising a bolt extending through said opening and one of said jaws, one of said jaws including one or more teeth constructed on arcs centering in the axis of the driving bolt and disposed to intersect the line of torque-strain through said axis, one or more of said teeth being continuous for 360° of circular arc.

13. In a torque-transmitting flexible coupling, in combination, a flexible disk having a bolt opening, clamping jaws between which said disk is disposed, and means adapted to effect clamping of the disk between the jaws comprising a bolt extending through said opening and one of said jaws, one of said jaws including a rigid clamping member having teeth continuous around said bolt adapted to clutch said disk.

14. In a torque-transmitting flexible coupling, in combination, a flexible disk having a bolt opening, clamping jaws between which said disk is disposed, and means adapted to effect clamping of the disk between the jaws comprising a bolt extending through said opening and one of said jaws, one of said jaws including a rigid clamping member having teeth continuous around and concentric with the axis of said bolt adapted to clutch said disk.

15. In a torque-transmitting flexible coupling, in combination, a flexible disk having a bolt opening, clamping jaws between which said disk is disposed, and means adapted to effect clamping of the disk between the jaws comprising a bolt extending through said opening and one of said jaws, one of said jaws including a rigid clamping member having a tooth continuous around and concentric with the axis of said bolt adapted to clutch said disk, said tooth having a flat top.

16. In a torque transmitting flexible coupling, in combination, a flexible disk, means adapted to connect said disk to another element for transmission of torque comprising clamping jaws between which the disk is interposed and means adapted to effect clamping of the disk between the jaws, one of said jaws including continuous teeth one around another adapted to clutch said disk.

17. In a torque transmitting flexible coupling, in combination, a flexible disk, means adapted to connect said disk to another element for transmission of torque comprising clamping jaws between which the disk is interposed and means adapted to effect clamping of the disk between the jaws, one of said jaws including continuous teeth one around another on one face of said jaw adapted to clutch said disk.

18. In a torque transmitting flexible coupling, in combination, a flexible disk, means adapted to connect said disk to another element for transmission of torque comprising clamping jaws between which the disk is interposed and means adapted to effect clamping of the disk between the jaws, one of said jaws including on one face, continuous teeth substantially concentrically arranged relative to one another, adapted to clutch said disk.

In testimony whereof I affix my signature, in the presence of two witnesses.

HENRY H. GILDNER.

Witnesses:
FLORENCE E. SLOAT,
ARTHUR R. TOLLES.